(12) United States Patent
Gooch et al.

(10) Patent No.: US 6,384,110 B1
(45) Date of Patent: May 7, 2002

(54) WATER-BORNE POLYURETHANE COATINGS BY MINIEMULSION POLYMERIZATION

(75) Inventors: Jan Gooch; Hai Dong; F. Joseph Shork, all of Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/312,329

(22) Filed: May 14, 1999

Related U.S. Application Data

(63) Continuation-in-part of application No. 08/696,361, filed on Aug. 13, 1996
(60) Provisional application No. 60/002,367, filed on Aug. 15, 1995.

(51) Int. Cl.[7] .............................. C08F 2/16; C08K 3/26
(52) U.S. Cl. ...................... 523/500; 524/458; 524/457; 524/459; 524/507
(58) Field of Search .......................... 523/500; 524/458, 524/457, 459, 507

(56) References Cited

U.S. PATENT DOCUMENTS

| | | |
|---|---|---|
| 4,497,932 A | 2/1985 | Trovati |
| 4,730,021 A | 3/1988 | Zom et al. |
| 5,023,294 A | 6/1991 | Cozzi et al. |
| 5,071,904 A | 12/1991 | Martin et al. |
| 5,739,194 A | 4/1998 | Natesh et al. |
| 5,786,420 A * | 7/1998 | Grandhee ...................... 525/7 |
| 5,854,332 A | 12/1998 | Swarup et al. |
| 5,969,030 A * | 10/1999 | Grandhee ................... 524/457 |
| 6,001,915 A * | 12/1999 | Schwarte et al. ........... 524/457 |

* cited by examiner

Primary Examiner—Diana Dudash
Assistant Examiner—Mina Haghighatian
(74) Attorney, Agent, or Firm—Hahn Loeser +Parks LLP

(57) ABSTRACT

A distinctive graft copolymer is made by dissolving an oil-modified polyurethane resin in various vinyl monomers (methyl methacrylate, styrene, etc.). The monomer/oil-modified polyurethane solution is then miniemulsion polymerized to form a latex consisting of submicron particles of polymer with the oil-modified polyurethane grafted onto the polymer backbone. The latex can be applied to a substrate, which on drying forms a polymeric film with good film properties. The latex can be used in a latex paint formulation in place of an acrylate, acetate or styrene-divinyl benzene latex. In this way it is possible to produce water-borne oil-modified polyurethane coatings which combine the properties of an oil-based polyurethane coating with easy application and cleanup. The coating will beneficially lack organic solvent exposure of typical standard oil-modified polyurethane coatings.

20 Claims, No Drawings

WATER-BORNE POLYURETHANE COATINGS BY MINIEMULSION POLYMERIZATION

This application is a continuation-in-part of application Ser. No. 08/696,361 filed on Aug. 13, 1996, which claims priority to provisional application 60/002,367 filed Aug. 15, 1995.

TECHNICAL FIELD

The present invention described herein pertains generally to miniemulsion polymerization processes in which an oil-modified polyurethane resin is dissolved in a vinyl monomer or monomer mixture which is then dispersed under high shear conditions, in the presence of at least one surfactant and optionally, a non-reactive cosurfactant, into an emulsion of submicron droplets. The emulsion is polymerized by a free radical mechanism under conditions which favor nucleation of the monomer droplets. The resultant submicron polymer particles contain polymer with oil-modified polyurethane resin grafted to the backbone polymer.

BACKGROUND OF THE INVENTION

Water-based coatings, and polymer latexes in particular, have become more widely used in the past several decades because they are environmentally friendly, offer easier clean up, and offer improved performance characteristics. However, in spite of these advantages, solvent based, oil-modified polyurethanes have remained important for some applications because of superior properties such as gloss, chemical resistance and film formation.

Emulsion polymerization is a widely used technique which has been extensively described in literature, both patent and non-patent. Production of synthetic latexes via emulsion polymerization is well-known. Among the polymers commonly produced by emulsion polymerization are styrene-butadiene copolymers, acrylic polymers and copolymers, and polyvinyl acetate. Polymers prepared by emulsion polymerization are widely used as binders in water-based latex paints for both interior and exterior use. Emulsion polymerization is also used to prepare polymer foams and polymers used as coatings.

Emulsion polymerization requires the following key ingredients: water, a monomer or mixture thereof, a surfactant or mixture thereof, and a polymerization initiator. The monomer or mixture thereof is typically dispersed into droplets and polymer particles are formed during the polymerization with the aid of a surfactant or mixture thereof with the aid of an agitator. Monomer droplet diameters are typically from 1 to 10 microns.

Emulsion and miniemulsion polymerizations have many similarities but the particle nucleation and reagent transport phenomena are very different. Conventional emulsion polymerization starts with a monomer emulsion comprised of relatively large (in the range of 1 to 10 microns) monomer droplets and significant free or micellar emulsifier. Particle nucleation takes place early in the reaction via homogeneous (water phase) reactions or via free radical entry into monomer-swollen micelles. Radicals can enter the monomer droplets but this phenomenon is generally discounted because of the relatively small droplet surface area. Nucleation stops or slows significantly after the surface area of the particles becomes sufficient to adsorb all of the emulsifier. The major locus of polymeriation thereafter is in the nucleated particles. The reagents (monomer, chain transfer agents, etc.) must move from the monomer droplets to the reaction sites in the particles. Transport of large hydrophobic molecules such as oil-modified polyurethane can be a problem in conventional emulsion polymerization.

Miniemulsion polymerization, by contrast, begins with submicron droplets which are able to accommodate most of the added emulsifier. High intensity fluid deformation and a cosurfactant are employed to generate and stabilize the small droplet size miniemulsion. Particle nucleation is primarily via droplet penetration and, if most droplets are nucleated, the reagents are located at the polymerization sites and mass transport, except for the radicals, is not involved. Either water-soluble or oil-soluble initiators can be employed in miniemulsion polymerization.

Monomer droplet size instability is observed in monomer emulsions. The smaller monomer droplets will disappear by two mechanisms. The first is flocculation into larger droplets. This can be effectively prevented by providing an adequate layer of surfactant at the droplet surface. The second is Ostwald ripening. This phenomenon consists of the diffusion of monomer out of the smaller droplets and into the larger ones; the polymer does not so diffuse. The net effect is a reduction in interfacial surface area, and hence, of surface free energy. In an unpolymerized conventional emulsion (which will be called herein a "macroemulsion"), the disappearance of the small droplets takes place in seconds. This precludes the nucleation of these droplets into polymer particles. In a miniemulsion, a combination of high shear and a cosurfactant are used. The high shear generates very small monomer droplets. The cosurfactant retards Ostwald ripening so that the small droplets can resist diffusional instability. The small droplets can then compete effectively for water-borne free radicals, and the locus of nucleation becomes predominantly the monomer droplets. Common cosurfactants include hexadecane and cetyl alcohol.

U.S. Pat. No. 5,686,518 discloses the use of monomer-soluble polymers as cosurfactants in miniemulsion polymerization, wherein the monomer-soluble polymers are non-reactive with the monomer polymerization and are effective as cosurfactants at a concentration of about 0.5 to about 5.0 percent by weight based on monomer plus polymer. The monomer polymerizations disclosed therein exhibited reaction rates slightly enhanced with increasing concentration of the non-reactive, monomer-soluble polymer cosurfactants.

SUMMARY OF THE INVENTION

In accordance with one aspect of the present invention, there is provided a process for miniemulsion polymerization of a monomer or mixture thereof in the presence of an oil-modified polyurethane resin, which comprises dissolving one or more oil-modified polyurethane resins having at least two carbon-carbon double bonds, in an ethylenically unsaturated monomer or mixture thereof, thereby forming a solution, and combining this solution with water and at least one surfactant, and agitating the resulting mixture. The monomer or mixture thereof is substantially insoluble in water and the one or more oil-modified polyurethane resins are substantially insoluble in water but soluble in the monomer or mixture thereof;

The amount of the one or more oil-modified polyurethane resins is from about 10 percent to about 120 percent based on monomer weight; thereby obtaining an essentially stable aqueous monomer emulsion comprising an aqueous continuous phase and an organic disperse phase. The disperse phase comprises a monomer or mixture thereof and one or more oil-based polyurethane resins, and is in the form of droplets having an average droplet diameter in the range from about 10 to about 1,000 nanometers.

A non-reactive cosurfactant, including, but not limited to, hexadecane, cetyl alcohol, or polymer soluble in said monomer or mixture thereof, may be added to the monomer/oil-based polyurethane solution in the amount of 1 to 5 percent by weight based on monomer to impart diffusional stability to the emulsion.

The emulsion is subjected to high rates of shear in a sonicator, homogenizer, colloid mill or other device capable of imparting rates of shear great enough to reduce the diameters of the droplets of the disperse phase to the range listed above.

This invention according to a further aspect provides a process which comprises: forming an aqueous monomer/oil-modified polyurethane resin emulsion by combining at least one ethylenically unsaturated monomer with at least one oil-modified polyurethane resin having at least two carbon-carbon double bonds; agitating the emulsion under high shear to form monomer particles having an average particle size in the range of about 10 to about 1,000 nanometers; and initiating the polymerization by adding a free radical initiator, thereby polymerizing the at least one ethylenically unsaturated monomer in the emulsion and forming a polymer emulsion in which the polymer content is in the form of particles having an average particle size in the range from about 10 to about 1,000 nanometers.

This invention according to a still further aspect provides a latex or polymer emulsion which is the product obtained by polymerizing the monomer emulsion by a free radical mechanism under conditions of miniemulsion polymerization. The polymer content is in the form of particles having an average particle diameter in the range from about 10 to about 1,000 nanometers.

These and other objects of this invention will be evident when viewed in light of he drawings, detailed description and appended claims.

DETAILED DESCRIPTION OF THE INVENTION

The best mode for carrying out the invention will now be described for the purposes of illustrating the best mode known to the applicant at the time. The example is illustrative only and not meant to limit the invention, as measured by the scope and spirit of the claims.

The term "latex" herein denotes a polymer emulsion. The terms "latex" and "polymer emulsion" will be used interchangeably in this specification. The product of the polymerization process of this invention is a latex.

The term "miniemulsion" herein denotes a monomer emulsion in which the average monomer droplet size is not in excess of about 1,000 nanometers (1 micron). This term is used to distinguish monomer emulsions and emulsion polymerization processes herein from conventional emulsion polymerization processes and starting monomer emulsions. Conventional starting monomer emulsions will be called "macroemulsions" herein.

The term "molecular weight" has its usual meaning to denote grams per gram mole of a substance. As applied to polymers herein, "molecular weight" in the absence of further qualification denotes number average molecular weight unless otherwise stated.

The terms "parts" and "percent" (or %) denote parts by weight and percentage by weight, respectively, unless otherwise stated.

The monomer emulsions of this invention are compositions in which water constitutes the continuous phase and a monomer or mixture thereof containing dissolved oil-modified polyurethane resin constitutes the disperse phase. Emulsions of this invention are the oil-in-water type. The disperse or organic phase constitutes from about 10 to about 60 percent of total emulsion weight, and conversely the continuous or aqueous phase constitutes about 40 to about 90 percent of total emulsion weight. The disperse phase, consisting essentially of monomer(s) and dissolved oil-modified polyurethane resin, is present as droplets having an average droplet diameter from about 10 to about 1,000 nanometers, preferably from about 80 to about 500 nanometers.

The monomeric starting material is a monomer or mixture thereof, i.e., one or more primary and optionally one or more secondary monomers. Primary monomers are addition polymerizable ethylenically unsaturated organic compounds which are essentially insoluble in water, i.e., which have water solubilities preferably ranging from essentially zero to about 15 weight percent, more preferably from essentially zero to about 5 weight percent, and most preferably from essentially zero to about 3 weight percent. Solubilities are measured in pure water and denote grams of dissolved monomer per 100 grams of water. Representative primary monomers which can be polymerized either alone or in monomer mixtures according to this invention include: methyl methacrylate (MMA), styrene, vinyl acetate, methyl acrylate, butyl acrylate, ethyl acrylate, butadiene and vinyl chloride. This list is representative and is not exhaustive. Secondary monomers are addition polymerizable ethylenically unsaturated organic compounds which are water soluble and are used only in small percentages in a monomer mix and only in the presence of at least one primary monomer. By water soluble, it is meant that the secondary monomer preferably has a water solubility greater than 85 weight percent, more preferably greater than 90 weight percent, and most preferably greater than 95 weight percent. The percentage of secondary monomer present in the monomer mix is preferably 0 to 5 percent, more preferably 0 to 3 percent, and most preferably 0 to 1 percent, based on the total monomer weight. Representative secondary monomers are acrylic acid and methacrylic acid. This list is representative and not exhaustive. Use of secondary monomers may impart desired properties to the coatings produced using this invention.

A range of monomer solubilities in water lies between the insoluble and soluble as defined herein, i.e., solubilities of monomer in water of greater than 15 weight percent and up to 85 weight percent. A range of concentration of secondary monomer in the monomer mix of greater than 5 percent also exists. Other combinations of monomer/water solubility and concentration of secondary monomer in primary monomer outside of the preferred ranges may be envisioned by one of ordinary skill in the art; such combinations require that the monomerlwater mix form a stable miniemulsion within the scope of this invention.

The oil-modified polyurethane resins useable in this invention are any of the type typically used in polyurethane coatings formulations, as exemplified by oil-modified polyurethane 138-0634 supplied by McWhorter Technologies. This resin contains 60% solid linseed modified polyurethane, 20% solvent naphtha (heavy alkylate), 20% naptha (hydrotreated heavy), 0.07% dibutyl tin oxide and 0.03% triphenyl phosphite. The polyurethane portion in this formulation is made from toluene diisocyanate (TDI) and no free TDI is left unreacted. Prior to use in one embodiment of this invention, solvents in the polyurethane formulation were removed by vacuum evaporation. Typical linseed oil as used in a reaction to produce the oil-modified polyurethane includes 35–60% linolenic, 17–24% linoleic, 12–34% oleic, and less than 10% saturated fatty acids. The oil-modified polyurethane is therefore a multifunctional resin which contains at least two double bonds per molecule. As used in the present invention, the oil-modified polyurethane has available unsaturation such that at least one of the at least two double bonds per molecule may be available to participate in a free-radical polymerization with the monomer, and at least one of the at least two double bonds may be available to participate in crosslinking.

No added cosurfactant is required in this invention since, under some conditions, the oil-based polyurethane resin itself may act to stabilize the monomer droplets against diffusional degradation, in addition to its function as a reactant in the monomer polymerization. However, in some cases it may be desirable to add a polymeric or non-polymeric, non-reactive cosurfactant. By non-reactive it is meant that a polymerized latex resulting from the use of such a nonreactive cosurfactant is essentially free of reaction products of 1) the non-reactive cosurfactant and the monomer, and 2) the non-reactive cosurfactant and the polymer formed during polymerization of the monomer. By essentially free of reaction products, it is meant that, while there may be some reaction between the non-reactive cosurfactant and the monomer or polymer formed during polymerization of the monomer, the concentration of the resulting reaction products is minor compared with the concentration of the reaction products of the oil-modified polyurethane and the monomer, and of the reaction products of the oil-modified polyurethane and the polymer formed during polymerization of the monomer. Thus, within the scope of this invention, a non-reactive cosurfactant acts only as a cosurfactant to stabilize the miniemulsion, in contrast with the oil-modified polyurethane, which may act to stabilize the miniemulsion and also will chemically react with the monomer and/or polymer formed by polymerization of the monomer to impart desired properties to coatings made using this invention.

Polymeric or non-polymeric non-reactive cosurfactants may be used but are not required for the invention. Either a single non-reactive cosurfactant may be used, or a mixture of polymeric, non-polymeric, or polymer and non-polymeric consurfactants may be used. The polymeric non-reactive cosurfactant is a polymer which is both highly water insoluble and highly soluble in the monomer of choice. The polymeric non-reactive cosurfactant may be a polymer (e.g., homopolymer, copolymer, or block or graft copolymer) or a mixture or blend thereof having a molecular weight in the range of about 3,000 to about 1,100,000, preferably from about 9,000 to about 750,000. Especially preferred non-reactive polymeric cosurfactants are those having a molecular weight in the range of about 350,000 to about 750,000. Representative polymeric non-reactive cosurfactants useable in the present invention include polymethyl methacrylate (PMMA), polystyrene, polyvinyl acetate, polymethylacrylate and polyethylacrylate. Generally, the copolymer may be selected from the group consisting of random copolymers, block copolymers, statistical copolymers and graft copolymers. Certain copolymers such as styrene-isoprene copolymer, and certain block polymers such as poly (styrene-block-butadiene) and poly (styrene-block-isoprene) are also useful. Other polymeric non-reactive cosurfactants may be used as long as they meet the above criteria of being essentially insoluble in water but soluble in the monomer or monomer mixture. A polymeric non-reactive cosurfactant which is a polymer of the monomer undergoing polymerization is preferred. Thus, polymethyl methacrylate is a preferred non-reactive cosurfactant when methylmethacrylate is the monomer. However, one may choose, as polymeric non-reactive cosurfactant, a polymer which is not the polymer obtained by polymerization of the monomer of choice.

The amount of polymeric non-reactive cosurfactant may be from about 0.5 to about 5.0 percent by weight based on monomer, and the oil-modified polyurethane and the non-reactive polymeric cosurfactant. Preferably the amount of polymeric non-reactive cosurfactant is from about 0.5 to about 2.0 percent by weight based on monomer, oil-modified polyurethane, and non-reactive polymeric cosurfactant.

The polymeric non-reactive cosurfactant dissolves in the monomer or monomer mixture to form the disperse (or organic) phase of the monomer emulsion. The resulting solution (the disperse phase) is an essentially homogeneous solution of monomer and polymer.

Nonpolymeric non-reactive cosurfactants may be used in place of polymeric cosurfactants, or in combination with them. Representative nonpolymeric non-reactive cosurfactants include hexadecane and cetyl alcohol. Non-reactive nonpolymeric cosurfactants, when used, are added in a concentration range of from about 0.5 to about 5 percent based on the weight of the monomer.

Conventional surfactants for emulsion polymerization may be used. Either a single surfactant or a mixture of surfactants may be used. Representative surfactants include: sodium lauryl sulfate and other alkyl sulfates; sodium dodecyl benzene sulfonate and other alkyl and aryl sulfonates; sodium stearate and other fatty acid salts; and polyvinyl alcohol and other non-ionic surfactants. The surfactant may be either an anionic, cationic or a non-ionic surfactant. When a mixture or combination of surfactants is used, the mixture may include an anionic or a cationic surfactant, plus a non-ionic surfactant, or two or more anionic or cationic surfactants, or two or more non-ionic surfactants. The amount of surfactant is from about 0.5 to about 5.0 percent by weight, based on monomer plus oil-modified polyurethane resin. The preferred amount is from about 0.5 to about 1.5 percent by weight, based on monomer plus oil-modified polyurethane resin.

Use of a non-reactive cosurfactant, including non-reactive, polymeric and non-polymer cosurfactants, or the oil-modified polyurethane resin itself, in accordance with this invention results in improved monomer emulsion stability. This is accomplished by a reduction in monomer droplet diameter, which in turn is attributable to the fact that the cosurfactant prevents or reduces the rate of Ostwald ripening. Ostwald ripening is the transfer of monomer from small droplets to large droplets to reduce the total surface energy of the system, resulting in an increase of the average droplet diameter in an emulsion. The other cause of growth in monomer droplet size is coalescence, which is inhibited by the surfactant or mixture thereof. By inhibiting diffusion of monomer from small droplets to large droplets, a cosurfactant slows down the emulsion breakdown process. In a macroemulsion, a monomer emulsion for a conventional emulsion polymerization in which no cosurfactant is used, disappearance of the small monomer droplets takes place in seconds, before nucleation can take place. When a cosurfactant according to this invention is used, Ostwald ripening is retarded so that nucleation of the monomer droplets takes place. In fact, it is possible to completely polymerize a miniemulsion of this invention prior to the onset of significant ripening.

Monomer emulsions according to the present invention are prepared as follows. The desired amount of non-reactive cosurfactant (if used), and the desired amount of oil-modified polyurethane resin are added to the monomer or mixture thereof, then mixed with gentle agitation (e.g., with a stirring bar) at room temperature until a homogenous solution is obtained. The amount of oil-modified polyurethane added to the monomer is preferably from about 10 percent to about 120 percent, more preferably about 20 percent to about 110 percent, and most preferably about 30 percent to about 100 percent, based on the weight of the monomer. While the temperature in this step is not critical (in general, any temperature between the freezing point and the boiling point of the monomer can be used), preferred temperatures for monomer miniemulsion formation are from about 20° to about 50° C., more preferentially from about 25° to about 40° C.

The solution prepared in the previous step is added to a previously formed solution of surfactant(s) in water. The entire contents are then subjected to high shear in order to form a miniemulsion. Suitable high shear mixing is obtained, for example, by sonication with a Fisher 300 Watt Sonic dismembrator for 5 minutes at 60 percent output (180 watts) with bulk mixing provided by a stirring bar. (The Fisher 300 Watt Sonic dismembrator is manufactured and distributed by Fisher Scientific Company, Pittsburgh, Pa. Fisher Scientific Company is a subsidiary of Allied-Signal, Inc., Morristown, N.J.) Other high shear mixing equipment, e.g., a colloid mill or homogenizer can be used if desired. (The sonic dismembrator herein described is suitable for laboratory scale. A colloid mill or homogenizer are suitable for production scale.) In general, any equipment capable of producing localized high shear along with moderate bulk mixing can be used.

While it is preferable to premix the surfactant (or surfactants) and water so as to form an aqueous surfactant solution before adding the solution of polymer in monomer, it is possible to charge the oil-modified polyurethane resin/monomer solution, water and surfactant separately to a vessel which is equipped with an agitator or mixer capable of emulsifying the contents.

The above steps result in the formation of an essentially stable monomer emulsion which comprises an aqueous continuous phase comprising water and at least one surfactant dissolved therein, and an organic disperse phase which contains the monomer content and the oil-modified polyurethane resin content of the emulsion, i.e., an ethylenically unsaturated monomer or mixture thereof and one or more oil-modified polyurethane resins dissolved therein. A non-reactive cosurfactant may or may not be present. The disperse phase is an essentially homogenous mixture of one or more monomers and one or more oil-modified polyurethane resins. The disperse phase is in the form of droplets having an average droplet diameter from about 10 nanometers to about 1,000 nanometers, preferably from about 80 to about 300 nanometers.

The aqueous monomer miniemulsion is essentially stable. The emulsion slowly "creams", i.e., the disperse phase slowly rises to the top so that a visible phase separation line appears. However, the shelf life of a miniemulsion of this invention will vary depending on the amount of surfactant and the amount of non-reactive cosurfactant (if any) used. In any case, the shelf life is sufficiently long so that the monomer content of the emulsion can be polymerized in less time than the time required for phase separation or "creaming". (The term "creaming" and variants thereof such as "cream" and "creams" refer to phase separation which takes place in unhomogenized milk, wherein butterfat globules slowly rise to the top of the container.

Creaming in milk is readily observable when the milk with a cream is contained in a glass bottle or other transparent container.)

The monomer content of the monomer emulsion is polymerized under free radical polymerization conditions in the presence of a free radical initiator. Both the initiator and the conditions may be conventional. Free radical polymerization conditions are generally obtained by adding a free radical initiator and allowing polymerization to take place. Suitable free radical initiators are known in the art. These include, for example, the organic peroxides such as benzoyl peroxide, lauroyl peroxide and dicumyl peroxide; and inorganic persulfates such as potassium persulfate or ammonium persulfate; azobis-(isobutyro nitrile) (AIBN); and redox pairs such as $Fe^{2+}/H_2O_2$; $ROH/Ce^{4+}$ (where R is an organic group such as C1–C6 alkyl or C5–C8 aryl); and $K_2S_2O_8/Fe^{2+}$. The initiators used in the present invention in general are known in the art. Basically, any free radical generating system which is effective at the polymerization temperature can be used. The type of initiator is not critical to this invention. The polymerization initiator may be either a water soluble or an oil soluble compound.

Polymerization may be carried out over a broad temperature range, e.g., from about 20° to about 90° C. The preferred polymerization temperature depends on the choice of initiator. A preferred polymerization temperature range is from about 25° to 20 about 80° C. The polymer particle size in the product polymer emulsion or latex is in the range of about 10 to about 1,000 nanometers, which is the same range as that of the monomer droplets in the monomer emulsion. There is no substantial change in particle size during polymerization in most cases. Usually the product polymer particle size will be in the range from about 10 to about 1,000 nanometers. The preferred product polymer particle size range is from about 80 to about 300 nanometers.

Polymer latexes produced according to the present invention can be used to formulate water-borne coatings such as latex paint. The coatings will have the environmental (lack of volatile organic emissions) and convenience (water cleanup) advantages of latex coatings, but with the hardness and durability properties of oil-modified polyurethane coatings which are normally applied from a solvent vehicle.

This invention will now be described in further detail with reference to the example which follows.

In the following example, the word "emulsion" is taken to mean emulsions (with or without polymeric or nonpolymeric, non-reactive cosurfactant) which have been created and evaluated for stability. The word "latex" is used to connote emulsions in which the monomer has been polymerized to form polymeric latexes. The "polydispersity" of the droplet or particle size distribution will be defined as the ratio of the number average diameter to weight average diameter.

EXAMPLE #1

Oil-modified polyurethane/polymer miniemulsion latexes were prepared using the following reagents: Oil-modified polyurethane was supplied by McWhorter Technologies as 138-0634 which contains 60% solid linseed modified polyurethane, 20% solvent naphtha (heavy alkylate), 20% naphtha (hydrotreated heavy), 0.07% dibutyl tin oxide and 0.03% triphenyl phosphate. The polyurethane portion was made from TDI (toluene diisocyanate), and no free TDI was left unreacted. The solvents were removed by vacuum evaporation before use. Methyl methacrylate (MMA), butyl acrylate (BA), acrylic acid (AA), potassium persulfate (KPS) (all from Aldrich), sodium lauryl sulfate (SLS) (Fisher), and benzoyl peroxide (BPO) (Fisher) were employed as supplied. The water was deionized.

Miniemulsions were prepared and polymerized according to the recipes shown in Table I:

TABLE I

Recipe for Miniemulsion Polymerization
200 parts water/100 parts total solids
0.02 mole KPS/L water and 0.02 mole SLS/L water
BPO 0.3% (based on total oil phase)

| Miniemulsion | Ingredients | | | | |
|---|---|---|---|---|---|
| | OMPU | MMA | BA | AA | BPO |
| 1 | 100 | 49 | 50 | 1.0 | 0.3 |
| 2 | 60 | 49 | 50 | 1.0 | 0.3 |
| 3 | 30 | 49 | 50 | 1.0 | 0.3 |
| 4[1] | 0 | 49 | 50 | 1.0 | 0 |

[1]Run 4 was run to obtain pure polyacrylics where 3 g PMMA was employed as non-reactive cosurfactant, and the reaction temperature was 60 C. KPS was 0.013 mol/L-water Miniemulsions were prepared and polymerized according to the recipes shown in Table I. The desired amount of SLS was dissolved in about 220 g of DI water and the KPS was dissolved in about 30 g DI water. The BPO was dissolved in the acrylic monomer mix (MMA, BA and M), and the OMPU was added. The mixture was stirred for several hours to complete dissolution of the OMPU. Then the oil phase was added to the SLS solution and sheared for 5 minute at high speed with a magnetic stirrer. This pre-emulsion was then sonicated for 15 minutes at 70% output with the Fisher 300 W Sonic Dismembrator while a magnetic stirrer provided bulk mixing.

Upon completion of sonication, the monomer miniemulsion was transferred to a 500-ml, 3-neck flask equipped with a nitrogen purge, condenser and a paddle stirrer. The flask was placed into a water bath. The system was purged for 15 minutes with nitrogen and brought to the polymerization temperature by adjusting the temperature of the water bath. Once the polymerization temperature was reached, the stirring rate was adjusted to about 220 rpm and the water-soluble initiator was injected by syringe. Approximately 5 g of samples were taken by a syringe at intervals during polymerization and injected into vials containing 0.5% hydroquinone solution in an ice bath. Monomer conversion was determined gravimetrically from these samples.

Droplet and particle size distributions were measured by quasi-elastic light scattering with a Malvern Autosizer IIc. The monomer emulsion was diluted about 50:1 with a monomer-saturated DI water solution containing 0.1 wt % SLS. The polymerized latex was diluted about 100:1 with a DI water solution containing 0.1 wt % SLS. Droplet size was recorded immediately after sonication. Measurements were made at 5 minute intervals. The Autosizer provides average diameters, standard deviations and distributions.

Shelf life was measured by placing approximately 5 ml of an unpolymerized emulsion in a capped glass vial and observing the time necessary for a visible creaming line to appear at room temperature. In order to observe the line easily, two drops of water-soluble red pigment solution were added.

The $^{13}C$ solution NMR spectra were recorded by a Bruker AMX 400, using deuterated chloroform as solvent. Pulse delay time was 2.0 sec, and inverse gated decoupling were applied with a 90 degree pulse length. Solvent extraction experiments were performed in a Soxhlet extractor with approximately 0.5 g dried latex. Ethyl ether was applied for 24 hours. All resin and grafted copolymer were assumed to be dissolved completely. Grafting efficiency was calculated from the quantity of polymer extracted. Chloroform, toluene, tetrahydrofuran (THF) and 1,4-dioxane were used sequentially in an exhaustive extraction to determine the percentage of the polymer which was crosslinked. Each solvent was applied for 12 hrs. Material which remained after extraction with the four solvents was considered to be crosslinked.

A SEIKO Instruments DMS 210 Tension Module was used to measure the dynamic viscoelasticity of films prepared from the synthesized latexes. The temperature ranged from −60° C. to 100° C., and the frequency was 1 Hz. Films were dried at room temperature with thickness of about 1 mm.

Transmission Electron Microscopy (TEM) analysis was performed with a Hitachi HF-2000 FE-TEM. The synthesized latexes were diluted with deionized water to about 100:1. These diluted latexes were stained for 24 hours by using 2 drops of 1 wt % osmium tetroxide solution in water. One drop of the stained latexes was placed on the coated side of a 200-mesh nickel grid in a petri dish. After 24 hours of drying, the sampies were ready to be tested.

The latexes were dried in a vacuum oven and then dissolved in THF at a concentration of 1 mg/ml. Gel permeation chromatography (GPC) was used to determine molecular weight. Uninhibited THF was used as the eluent with a flow rate of 07 ml/min pumped by a Waters 510 HPLC Pump. A Waters 410 Differential Refractometer was used for detection of concentration. The chromatography conditions were: three columns (300×7.8 mm, pore sizes: $10^3$, $10^4$, and $10^5$ Å); temperature, 30° C. TriSEC Conventional GPC Software (Viscotek) was used to calculate the molecular weight with respect to polystyrene.

Miniemulsions were prepared using the recipes for Runs I through 3 in Table I. No initiator was added. The resulting emulsions were subjected to varying levels of sonication and the shelf lives and droplet sizes were determined. The results are shown on Table II. It can be seen that, with increasing sonication, the emulsion becomes more stable, and the droplet size becomes smaller. For the same level of sonication, the higher the concentration of resin, the larger the size. This is likely because the viscous resin requires more energy to break up. When sonication time is greater than 10 minute with an output of 70%, at all of the samples are very stable (shelf life of several months).

TABLE II

Droplet Size & Shelf-life versus Sonication

| Sample[b] | Sonication Time[a], min | Shelf-life | Droplet Size[c], nm |
|---|---|---|---|
| 1 | 0 | <1 min | 1567.8 |
| 1 | 5 | ≈2 days | 351.9 |
| 1 | 10 | ≈2 months | 278.0 |
| 1 | 15 | >5 months | 225.4 |
| 1 | 20 | >5 months | 212.6 |
| 2 | 0 | <1 min | — |
| 2 | 5 | ≈1 month | 360.4 |
| 2 | 10 | >5 months | 241.4 |
| 2 | 15 | >5 months | 199.9 |
| 2 | 20 | >5 months | 172.1 |
| 3 | 0 | <1 min | — |

TABLE II-continued

Droplet Size & Shelf-life versus Sonication

| Sample[b] | Sonication Time[a], min | Shelf-life | Droplet Size[c], nm |
|---|---|---|---|
| 3 | 5 | >5 months | 241.6 |
| 3 | 10 | <5 months | 203.8 |
| 3 | 15 | >5 months | 143.0 |
| 3 | 20 | >5 months | 119.8 |

[a]Sonication was performed at 70% output.
[b]Sample recipe is the same as shown in Table I except that no initiators were added.
[c]Here, droplet size is characterized as Z-average diameter.

As described above, the dominant nucleation mechanism in miniemulsion polymerization is thought to be droplet nucleation. Consequently, the final latex particle size will be similar to the initial monomer droplet size. The particle size decreased slightly during polymerization. This can be attributed to the increase of particle density, because polymer density is higher than that of monomers. Both the long shelf-life stability (>5 months) and the similar particle size throughout polymerization suggest that the method of polymerization was hybrid miniemulsion polymerization. That means the predominant locus nucleation mechanism was droplet nucleation. Although there may have been micellar or homogeneous nucleation, the very large interfacial area of the very small monomer droplets adsorbs most of the surfactant, leaving little to initiate micellar of homogeneous nucleation.

Runs were first made according to the recipes in Table I, but with a polymerization temperature of 60 ° C. The rates of polymerization in the presence of OMPU were found to be much slower than in the equivalent recipe without OMPU. The ould be that some impurities in the resin act as retarding agent (these impurities can be introduced into the resin as additives during resin synthesis), or the resin itself reduces the polymerization rate by diluting monomer concentration and by resin chain transfer that produces less active adicals. To overcome this problem, the temperature was increased from 60° C. to 80° C., the amount of KPS added was doubled, and 0.5 wt % (based on total monomer) oil soluble initiator (BPO) was added. The polymerization rate was increase significantly, bringing the reaction time back to the level of conventional emulsion polymerization. The rate of reaction decreases as the level of OMPU is increased. This suggests that the resin might be retarding the polymerization.

As mentioned before, a linseed oil modified polyurethane was used as the resin. The main fatty acids in linseed oil are 35–60% linolenic, 17–24% linoleic, 12–34% oleic, and less than 10% saturated fatty acids. During polymerization grafting can occur by chain transfer from the propagating acrylic free radical to the resin. The resulting fatty acid radical may be substantially less reactive than the acrylic radical, resulting in reduction in polymerization rate. A second main mechanism for grafting involves copolymerization between the polymerizing radical and double bonds of the oil-modified polyurethane. Therefore, considering the possible grafting reactions, the resulting latex may comprise a mixture of pure polyacrylics, grafted copolymer of acrylics and oil-modified polyurethane, and the remaining oil-modified polyurethane resin. Therefore, at least some of the oil-modified resin is grafted onto the polymer formed from the polymerization of the monomer.

The determination of grafting efficiency will help to determine if grafting has occurred, of if the product is a blend of polyacrylic homopolymer and polyurethane. Curing ("drying") in oil-modified polyurethane occurs through reactions of the residual double bonds in the fatty acids with atmospheric oxygen. Because the drying reactions require residual double bonds, it is important to know what fraction of the original double bonds in the fatty acids have been reacted during the polymerization process. Since many of the fatty acids have more than one carbon-carbon double bond, it is possible to have crosslinked material. Polymer which is heavily crosslinked will not form good films, and so it is important to determine the percentage of crosslinked material. $^{13}$C solution NMR was used to determine the residual double bonds available after polymerization for film curing. Solvent extractions were performed to determine the grafting efficiency of acrylic monomers and percent crosslinking GPC measurements were used to determine the molecular weight of the products.

A delay time of 2.0 sec and inverse gated decoupling with a 900 pulse length was used to obtain quantitative $^{13}$C NMR spectra. The residual double bonds of fatty acid indicated by the resulting spectra were calculated with the formula below:

$$\% \text{ double bonds remained} = \frac{(S_{double\ bonds}/S_{153})_{run}}{(S_{double\ bonds}/S_{153})_{OMPU}} \times 100\%$$

where $S_{double\ bonds}$ is the peak area of fatty acids' double bonds
$S_{153}$ is the peak area of carbon in urethane bonds From Table III it may be seen that most of the original double bonds bonds (>61%) remained for film curing.

TABLE III

Results of $^{13}$C NMR

| Sample Code Run # | Peak area at 153 ppm | 126–133 ppm | Double bonds of fatty acids | Double bonds remaining, % |
|---|---|---|---|---|
| 1 | 1 | 4.29 | 3.79 | 70 |
| 2 | 1 | 3.79 | 3.29 | 61 |
| 3 | 1 | 4.15 | 3.65 | 68 |
| OMPU | 1 | 5.84 | 5.34 | n/a |

The crosslinked percentage is defined as the weight percent of the total polymer that is crosslinked. To determine the crosslinked percentage, chloroform, toluene, THF and 1,4-dioxane were used sequentially to extract soluble polymer The remaining polymers after all extractions were assumed to be crosslinked. Table IV shows that for all samples, crosslinked percentage is less than 4.8%. At this level, it should not dversely affect the film forming properties of the latexes.

TABLE IV

Grafting Efficiency & Crosslinked Percentage

| Run # | 1 | 2 | 3 |
|---|---|---|---|
| Grafting Efficiency | 53% | 56% | 29% |
| Crosslinked Percentage | 4.8% | 1.3% | 2.8% |

The grafting efficiency is defined as the percent of the total acrylic monomer polymerized which is grafted to the OMPU. Ethyl ether is a good solvent for OMPU, but does not dissolve polyacrylics at all. Thus, it was used to determine the grafting efficiency of polyacrylics:

$$\text{Grafting Efficiency} = \frac{m_{be} * \left(\frac{m_{acrylic}}{m_{ompu} + m_{acrylic}}\right) - m_{ae}}{m_{be} * \left(\frac{m_{acrylic}}{m_{ompu} + m_{acrylic}}\right)} \times 100\%$$

where $m_{ompu}$=the mass of oil-modified polyurethane used in the reaction $m_{acrylic}$=the mass of acrylic monomers used in the reaction Grafting will enhance the miscibility between polyacrylics and the resin, which in turn will benefit the film properties formed by the latex. Table IV shows that all of the latexes have a grafting efficiency of at least 29%.

The number average molecular weight was calculated via GPC for Peaks A, B and C with respect to a polystyrene standard, as shown in Table V:

TABLE V

Molecular Weight Averages

| Run # | Ratio of acrylic monomer to resin | Number average molecular weight (g/mol) | | |
|---|---|---|---|---|
| | | Peak A | Peak B | Peak C |
| 1 | 100/100 | 67,400 | 4,210 | 1,490 |
| 2 | 100/60 | 85,000 | 5,470 | 2,010 |
| 3 | 100/30 | 51,300 | 4,390 | 1,580 |

The area of Peak A increases with the increasing ratio of acrylic to resin. The molecular weight of this peak is in the range of several ten thousands and is probably pure polyacrylic or graft polymer. Run 2 (acrylic; resin=100:60) had a much larger molecular weight than those of Runs 1 and 3. The addition of resin may reduce the polymer molecular weight by chain transfer. Also, grafting may raise the molecular weight of the grafted material. It would appear that at some ratio of acrylic-to-resin, these two opposing mechanisms may cause a maximum in the molecular weight. The molecular weight of Peak B is approximately 4,500 which corresponds to that of the OMPU. This peak area increases when the acrylic-to-resin ratio decreases. Peak C has a molecular weight of approximately 1,500–2,000 which is substantially lower than that of resin, and its area increases with the increasing ratio of monomer to resin. These two factors indicate the possibility of low molecular weight acrylic oligomers generated by the chain transfer.

It was determined by solvent extraction that a significant amount of acrylic monomer reacted with resin to produce graft copolymer, while the remaining monomer formed pure polyacrylic. The miscibility between those two kinds of polymer and other possible components are important for the film properties. DMA of samples from Runs 1, 2, and 3 showed the glass transition for pure polyacrylic, indicating that polyacrylic was phase-separated from other possible components in the films. TEM analysis of the samples suggests that there is a core/shell structure with a resin-rich shell. The graft copolymer found by solvent extraction may act to mitigate the immiscibility, thereby benefiting the film properties.

Film hardness testing was performed by the Pencil Test (ASTM D 3363-74), and film adhesion was measured by the Tape Test (ASTM D 3359-78). These films were cast from latex with 5% hydroxyethyl cellulose added as a thickener, using a Baker Coater draw-down. The films were dried at room temperature for two days. The results are given in Table VI. Adhesion is good for all samples Hardness depends on the extent of curing ("drying") As shown in Table V, the addition of drying agent improved the curing rates of the films. Further results show that the pencil hardness of all the samples reach HB after 3 months of curing. It is expected that with proper addition of drying agents, HB hardness can be reached in only several days.

TABLE VI

Film Hardness & Adhesion Properties

| Sample[a] | 1 | 2 | 3 | 4 | 5 | 6 |
|---|---|---|---|---|---|---|
| Hardness | B | B | B | HB | HB | HB |
| Adhesion[b] | 5 | 5 | 4 | 5 | 5 | 4 |

[a]Film Sample 1, 2 and 3 were made from latex Runs 1, 2 and 3 respectively with air drying; Film Sample 4, 5 and 6 were made from latex Runs 1, 2 and 3 respectively with drying agent. Mixed metal catalyst ($Ca^{2+}$, $Co^{2+}$, $Mg^{2+}$, and $Cr^{2+}$) was added to accelerate drying.
[b]Adhesion is classified to 5 scales according to the standard, with "5" as the best.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. While this invention has been described in detail with reference to preferred embodiments, it shall be understood that such description is by way of illustration and not by way of limitation.

What is claimed is:

1. A process for preparing an aqueous monomer/oil-modified polyurethane emulsion which comprises:
    mixing at least one oil-modified polyurethane resin having at least two carbon-carbon double bonds in at least one ethylenically unsaturated monomer or mixture thereof, thereby forming an oil-modified-polyurethane-resin-in-monomer solution, and
    combining the oil-modified-polyurethane-resin-in-monomer solution solution with water, and
    at least one surfactant, and
    agitating the resulting mixture under high shear;
    thereby obtaining an aqueous monomer emulsion comprising:
        an aqueous continuous phase; and
        an organic disperse phase;
        the organic disperse phase comprising:
            said at least one ethylenically unsaturated monomer or mixture thereof and said at least one oil-modified polyurethane resin; and
            said organic disperse phase being in the form of droplets having an average droplet diameter range from about 10 to about 1,000 nanometers;
    wherein said oil-modified-polyurethane-resin-in-monomer solution comprises: about 10 percent to about 120 percent of oil-modified polyurethane resin based on the weight of the at least one ethylenically unsaturated monomer.

2. The process of claim 1 wherein the step of mixing the at least one oil-modified polyurethane resin with at least one ethylenically unsaturated monomer or mixture thereof further comprises adding at least one non-reactive cosurfactant.

3. The process of claim 2 wherein the non-reactive cosurfactant is a polymeric non-reactive cosurfactant selected from the group consisting of homopolymers, random copolymers, block copolymers, statistical copolymers and graft copolymers.

4. The process of claim wherein the amount of polymeric non-reactive cosurfactant is from about 0.5 to 5.0 percent by weight based on the amount of the at least one ethylenically unsaturated monomer and the oil-modified polyurethane resin and polymeric non-reactive cosurfactant added.

5. The process of claim 1 in which the amount of said one or more oil-modified polyurethane resins is from about 20 percent to about 110 percent by weight based on the amount of the at least one ethylenically unsaturated monomer.

6. The process of claim 1 in which the amount of said one or more oil-modified polyurethane resins is from about 30 percent to about 100 percent by weight based on the amount of the at least one ethylenically unsaturated monomer.

7. The process of claim 1 wherein the at least one ethylenically unsaturated monomer or mixture thereof comprises at least one primary monomer having a water solubility of from 0 to about 5 weight percent, and optionally at least one secondary monomer having a water solubility greater than 95 weight percent.

8. The process of claim 7 wherein the at least one primary monomer has a water solubility of from 0 to about 3 weight percent.

9. The process of claim 1, wherein the at least one ethylenically unsaturated monomer or mixture comprises: at least one primary monomer selected from the group consisting of styrene, vinyl acetate, C1 through C4 inclusive alkyl acrylate, C1 through C4 inclusive alkyl methacrylate, butadiene and vinyl chloride; and optionally at least one secondary monomer selected from the group consisting of acrylic acid and methacrylic acid; wherein the concentration of the at least one secondary monomer is from 0 to 3 percent, based on the total monomer weight.

10. A process according to claim 1 in which the weight of said organic disperse phase is from about 10 percent to about 60 weight percent based on total emulsion weight.

11. A process according to claim 1 wherein the temperature of the process is from about 20 to about 50° C.

12. The process of claim 1 which further comprises adding a free radical initiator after the step of agitating the mixture under high shear.

13. The process of claim 2 wherein the non-reactive cosurfactant is a nonpolymeric non-reactive cosurfactant selected from the group consisting of hexadecane and cetyl alcohol.

14. The process of claim 13 wherein the concentration of the non-reactive cosurfactant is from about 0.5 to about 5 percent based on the weight of the at least one ethylenically unsaturated monomer.

15. A process which comprises:
forming an aqueous monomer/oil-modified polyurethane resin emulsion by combining at least one ethylenically unsaturated monomer with at least one oil-modified polyurethane resin having at least two carbon-carbon double bonds;
agitating the emulsion under high shear to form monomer particles having an average particle size in the range of about 10 to about 1,000 nanometers; and
initiating the polymerization by adding a free radical initiator, thereby polymerizing the at least one ethylenically unsaturated monomer in the emulsion and forming a polymer emulsion in which the polymer content is in the form of particles having an average particle size in the range from about 10 to about 1,000 nanometers.

16. A graft copolymer latex which comprises:
a polymer of at least one ethylenically unsaturated monomer; and
at least one oil-modified polyurethane resin onto at least part of which is grafted at least part of the polymer of the at least one ethylenically unsaturated monomer; thereby forming a graft copolymer;
the graft copolymer latex having an average particle diameter from about 10 to about 1,000 nanometers; and
the graft copolymer having a number average molecular weight of from about 40,000 to about 90,000;
wherein the amount of oil-modified polyurethane resin is from about 10 to about 120 percent by weight based on the weight of the at least one ethylenically unsaturated monomer.

17. The latex of claim 16, wherein the at least one ethylenically unsaturated monomer or mixture comprises: at least one primary monomer selected from the group consisting of styrene, vinyl acetate, C1 through C4 inclusive alkyl acrylate, C1 through C4 inclusive alkyl methacrylate, butadiene and vinyl chloride; and optionally at least one secondary monomer selected from the group consisting of acrylic acid and methacrylic acid; wherein the concentration of the at least one secondary monomer is from 0 to 3 percent, based on the total monomer weight.

18. The process of claim 1 wherein said droplets have an average droplet diameter of about 80 to about 500 nanometers.

19. The process of claim 9, wherein the concentration of the at least one secondary monomer is from 0 to 1 percent, based on the total monomer weight.

20. The latex of claim 17, wherein the concentration of the at least one secondary monomer is from 0 to 1 percent, based on the total monomer weight.

\* \* \* \* \*

UNITED STATES PATENT AND TRADEMARK OFFICE
CERTIFICATE OF CORRECTION

PATENT NO.    : 6,384,110 B1
DATED         : May 7, 2002
INVENTOR(S)   : Gooch et al.

It is certified that error appears in the above-identified patent and that said Letters Patent is hereby corrected as shown below:

<u>Column 15,</u>
Line 3, replace claim 4 with the following:
4.   The process of claim 3 wherein the amount of polymeric non-reactive cosurfactant is from about 0.5 to 5.0 percent by weight based on the amount of the at least one ethylenically unsaturated monomer and the oil-modified polyurethane resin and polymeric non-reactive cosurfactant added.

Signed and Sealed this

Twenty-fourth Day of December, 2002

JAMES E. ROGAN
*Director of the United States Patent and Trademark Office*